(12) United States Patent
Fromherz et al.

(10) Patent No.: US 6,895,292 B2
(45) Date of Patent: May 17, 2005

(54) PREDICTIVE AND PREEMPTIVE PLANNING AND SCHEDULING FOR DIFFERENT JOB PRIORITIES SYSTEM AND METHOD

(75) Inventors: Markus P. J. Fromherz, Palo Alto, CA (US); Daniel G. Bobrow, Palo Alto, CA (US)

(73) Assignee: Palo Alto Research Center Inc., Palo Alto, CA (US)

( * ) Notice: Subject to any disclaimer, the term of this patent is extended or adjusted under 35 U.S.C. 154(b) by 0 days.

(21) Appl. No.: 10/424,661

(22) Filed: Apr. 28, 2003

(65) Prior Publication Data

US 2004/0225394 A1 Nov. 11, 2004

(51) Int. Cl.[7] .............................................. G06F 19/00
(52) U.S. Cl. ........................... 700/101; 700/99; 705/10
(58) Field of Search ................... 700/99, 100, 101–108, 700/97, 29; 705/7–10; 234/23–24

(56) References Cited

U.S. PATENT DOCUMENTS

| 5,095,342 A | 3/1992 | Farrell et al. ................ 355/319 |
|---|---|---|
| 5,159,395 A | 10/1992 | Farrell et al. ................ 355/319 |
| 5,557,367 A | 9/1996 | Yang et al. .................. 355/202 |
| 5,559,710 A * | 9/1996 | Shahraray et al. .......... 700/100 |
| 5,696,893 A | 12/1997 | Fromherz et al. ........... 395/112 |
| 5,826,104 A | 10/1998 | Rifkin ........................ 395/835 |
| 5,890,134 A * | 3/1999 | Fox ............................... 705/9 |
| 6,105,520 A * | 8/2000 | Frazer et al. ................ 112/117 |
| 6,115,646 A | 9/2000 | Fiszman et al. ............. 700/181 |
| 6,321,133 B1 * | 11/2001 | Smirnov et al. ............. 700/100 |
| 6,400,999 B1 * | 6/2002 | Kashiyama et al. ......... 700/100 |

OTHER PUBLICATIONS

U.S. Appl. No. 10/284,560 titled "Planning and Scheduling Reconfigurable Systems with Regular and Diagnostic Jobs" to Markus P.J. Fromherz filed Oct. 30, 2002.

* cited by examiner

*Primary Examiner*—Kidest Bahta
(74) *Attorney, Agent, or Firm*—Linda M. Robb

(57) ABSTRACT

For an automated manufacturing system having a number of modules with numerous alternative capabilities, a computer-controlled system provides for configuration-specific reprioritization of jobs. The computer-controlled system includes at least one system controller for planning and scheduling utilization of selected module capabilities in the production of jobs having not less than one work unit. Module capabilities include the relative costs of the module capabilities.

23 Claims, 4 Drawing Sheets

PREDICTIVE AND PREEMPTIVE PLANNING AND SCHEDULING FOR DIFFERENT JOB PRIORITIES SYSTEM AND METHOD

CROSS REFERENCE TO RELATED APPLICATIONS

The following copending applications, U.S. application Ser. No. 10/424,322, filed Apr. 28, 2003, titled "Monitoring and Reporting Incremental Job Status System and Method", and U.S. application Ser. No. 10/424,620, filed Apr. 28, 2003, titled "Planning and Scheduling for Failure Recovery System and Method", are assigned to the same assignee of the present application. The entire disclosures of these copending applications are totally incorporated herein by reference in their entirety.

INCORPORATION BY REFERENCE

The following U.S. patent is fully incorporated herein by reference: U.S. Pat. No. 5,696,893 ("System for Generically Describing and Scheduling Operation of Modular Printing Machine").

BACKGROUND OF THE INVENTION

This invention relates generally to the control and management of automated manufacturing systems, and more particularly to applying model-based planning and scheduling to reprioritization and reallocation of resources among jobs of differing priorities.

Current system control software for production systems requires that jobs being executed fully complete before other jobs can be executed. This is unsatisfactory for high-volume systems, in which jobs are often long, particularly in those instances in which new jobs have a higher priority than jobs being produced, and instead of waiting for a long, lower-priority job to finish, one would like to produce those new jobs in parallel or instead of the lower-priority jobs. Scheduling and system control as implemented for traditional, in-line systems, or even as proposed for reconfigurable systems, only allows adding in new jobs if they do not conflict with jobs being executed. For example, in a printing system, if the system has sufficient capacity and the necessary resources are available, a new job could be inserted at the front of the job queue and thus delay the remainder of unfinished jobs. However, the current jobs may have reserved all the finishers, in which case a new job cannot be scheduled and executed until at least one of the current jobs has completed. In such cases, it would be desirable to interrupt or even abort long low-priority jobs if high-priority jobs enter the job queue. Reconfigurable production systems, in particular systems with parallel capabilities, should also allow one to reallocate some of the system's capabilities to higher-priority jobs. This would increase productivity and customer satisfaction.

To accomplish this end, it would be useful for the system control software, with help from the planner and scheduler, to make use of the system's various modules and often extensive capabilities to reroute jobs in process to permit work on new higher priority jobs, or to intelligently purge parts of a job and restart it later.

SUMMARY OF THE INVENTION

Briefly stated, and in accordance with one aspect of the present invention, a computer-controlled system provides for configuration-specific reprioritization of jobs for an automated manufacturing system having a number of modules with numerous alternative capabilities. The computer-controlled system includes at least one system controller for planning and scheduling utilization of selected module capabilities in the production of jobs having not less than one work unit. Module capabilities include the relative costs of the module capabilities.

In accordance with another aspect of the invention, there is disclosed a method for configuration-specific reprioritization of jobs in a reconfigurable production system having a plurality of modules with a plurality of alternative capabilities for processing work units. The method includes selecting at least one work unit from a job having at least one work unit and at least one priority to be planned for production. The capabilities necessary for executing the work unit are determined, as well as their availability for executing the work unit. This process is repeated until all work units have been planned. Those work units of a job for which sufficient module capabilities are not available are temporarily removed from consideration.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method and system that applies model-based planning and scheduling to reprioritization and reallocation of resources among arriving jobs of differing priorities within a system controller, in which the controller provides for continued use of all available system capabilities and reports system state and updated module models as necessary after each capability is executed. To accomplish this, the method inserts, plans, and schedules new jobs, while concurrently completing unfinished job elements correctly while taking into account their constraints, for example shared resources. In those instances in which an unfinished job cannot be interrupted (and later restarted) correctly, it is further decided whether to abort the unfinished job or to delay the inserted job. Given the system state in a constraint-based format, the method attempts to create a new plan and schedule to produce the unfinished job elements and the remainder of the current jobs together with the new job(s) inserted, using the capabilities of the system and the original job constraints. In contrast to existing approaches to scheduling, the system and method described herein is made possible by planning and scheduling from the current system state, inserting new jobs, and aborting and redoing work as necessary.

The system and method apply to control software used for multi-step production processes such as manufacturing, printing, or assembly and provide for the handling of complex operations over complex paths to provide flexible routing, optimal productivity, and optimal load balancing. In the following description numerous specific details are set forth in order to provide a thorough understanding of the present invention. It would be apparent, however, to one skilled in the art to practice the invention without such specific details. In other instances, specific implementation details have not been shown in detail in order not to unnecessarily obscure the present invention.

Figure 1:
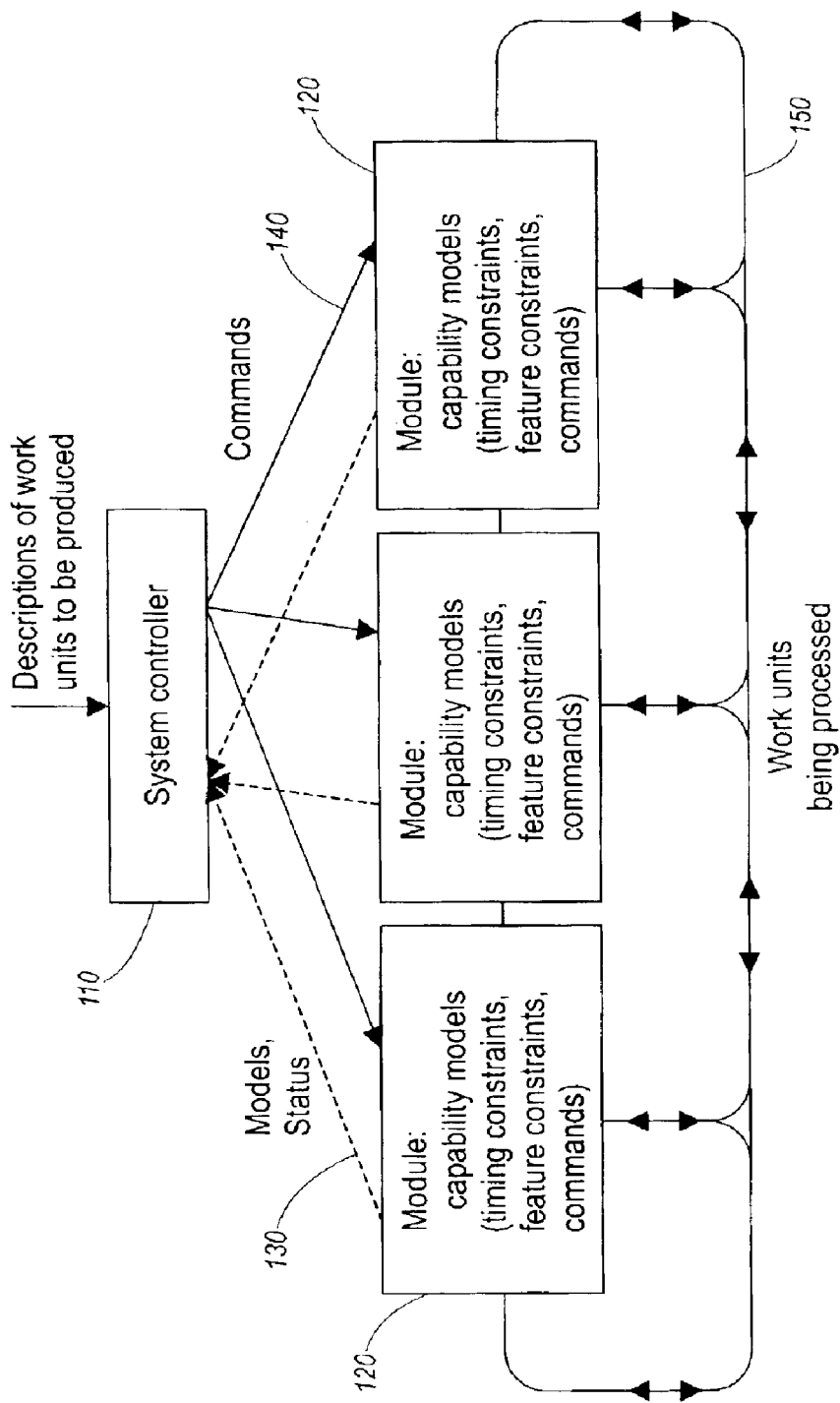
FIG. 1 illustrates a system for predictive and preemptive planning and scheduling for different job priorities in accordance with one embodiment of the subject invention.

Turning now to the drawings, wherein the purpose is for illustrating the embodiments of the system and method, and not for limiting the same, FIG. 1 illustrates a controller for planning and scheduling for different job priorities in conformance with one embodiment of the subject system. In a system 100, system controller 110 receives descriptions of work units to be produced from any known type of job input source. These descriptions correspond to descriptions of the desired output products or other goals to be achieved. They may specify attributes (or properties) of the products, values or ranges or general constraints for these attributes, and possibly constraints on the timing of the production (e.g., deadlines), but generally without specifying how the products are to be produced. Descriptions of work units are typically grouped into jobs, and are received incrementally. Because system control, including planning and scheduling, as well as execution, happens incrementally, these operations all occur concurrently. Therefore, it may not always be possible or desirable to generate a plan and then execute it without modification. System controller 110 also receives, along paths 130, capability models and performance log information from each module 120 in the system. The capability models are descriptions of how the modules move and transform work units, generally together with information about the attributes and timing of the work units. Models may be sent to the system controller only once when the production system is started up, or the models may be updated regularly or when changes occur. Such changes in the modules (and therefore in the models) may, for example, be the reconfiguration of the modules, changes in timing values, and the unavailability of resources (and thus some capabilities). The capability models include, for example, timing constraints (e.g., the duration of execution of a capability, the time during which a resource is occupied, or the reservation of a resource), feature constraints (e.g., limits on the size of the work units being processed, transformation of the work units such as changing the orientation of a part or adding two parts together), and commands (e.g., the names or identifications of the operations corresponding to the capabilities, together with times and possibly other information). The timing and feature constraints describe when and how a capability can be applied to a work unit. The commands are the commands that are sent to the modules in order to start the corresponding operations.

Modules 120 may encompass many varying types of production systems, for example machine modules of a print engine, such as a feeder module, mark engine module, finisher module, or transport module. Alternatively, modules 120 may include the analysis modules of a biotech screening system, which may comprise a preparation module, heating module, mixing module, analysis module, or transport robot. Manufacturing line modules may include a machining module, assembling module, testing module, transport robot, or packaging module. A packaging line may include a bottle filling module or a labeling module. System controller 110 considers all possible system capabilities when searching for schedules for the desired work units.

Planning and scheduling some or all of the desired work units of one or more jobs results in a set of selected and scheduled capabilities. With these available, the system controller 110 sends the instruction commands corresponding to the scheduled capabilities to modules 120 along paths 140. Each of the modules then performs its task sequence for the completion of the specified job. As can be seen in path 150, which illustrates the path of the work units being processed, work may cycle repeatedly within a particular module 120 before moving to the next module in succession, or work may cycle repeatedly among several modules before passing to a third module. Although only three modules 120 are illustrated for the purposes herein, it will be understood that a system may include numerous modules, depending on the complexity of the job requirements. The modules may have various configurations within a system that is reconfigurable. Additionally there is also capability for operator feedback as to the work being scheduled on the modules and the state of the system at any point in time.

Figure 2:
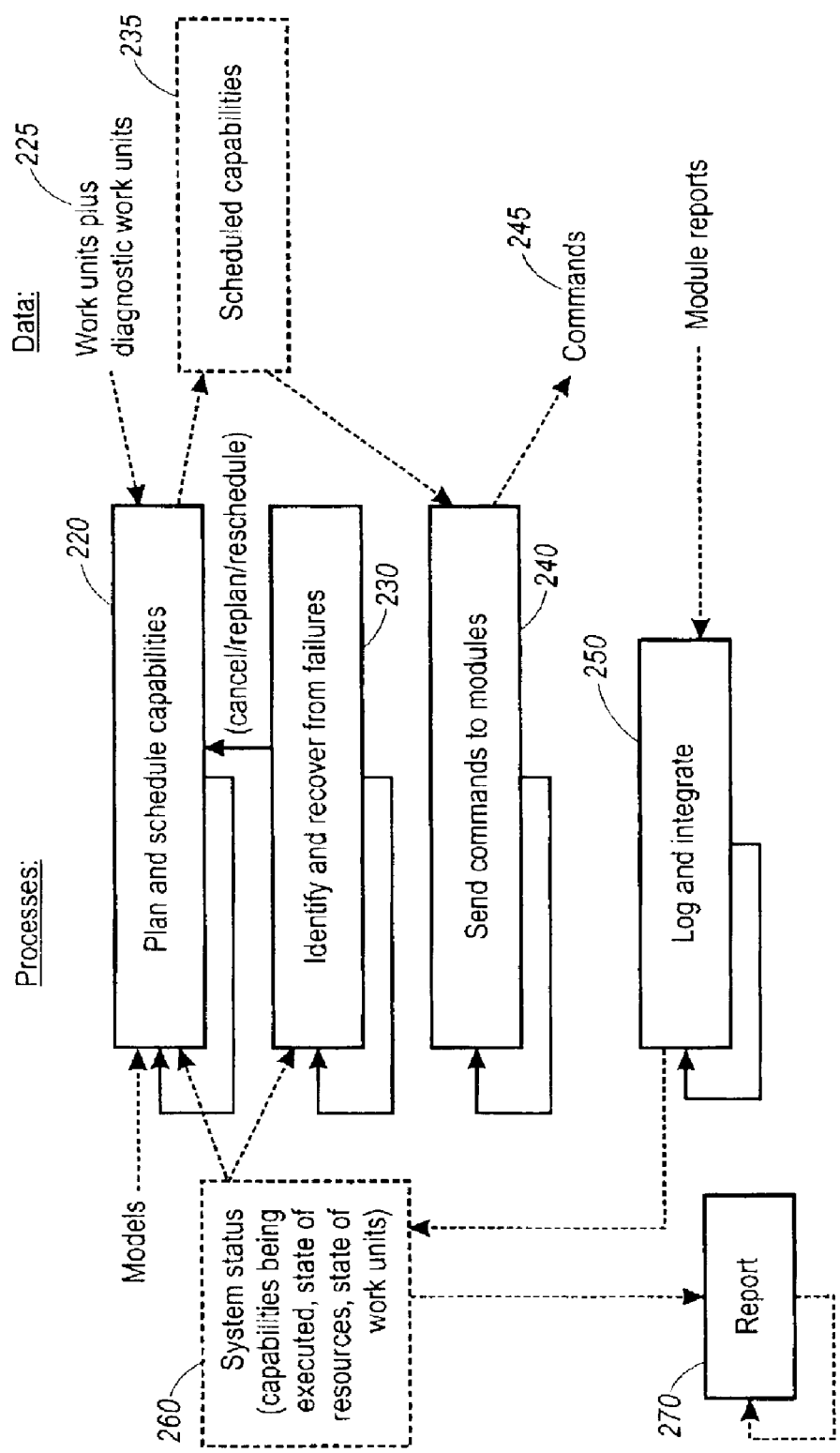
FIG. 2 provides a flow diagram detailing the flow of operations to accomplish predictive planning and scheduling for different job priorities in accordance with one embodiment of the subject invention.

The system control software plans and schedules jobs by identifying job priorities, selecting capabilities, determining the timing variables of these capabilities and executing scheduled capabilities. FIG. 2 illustrates the functions of monitoring, reporting, and an approach to predictive and preemptive planning and scheduling for differing job priorities by the system controller. In this diagram, method steps are described in terms of data received and provided to each subsequent step in the process. Each of the steps 220, 230, and 240 in this process may be executed in sequence (one after the other) or concurrently. In either case, each step consumes data 225, 235, or discrepancies between schedule and execution provided by a previous step or another action within the system, and produces data 235, 245, and ultimately 270 for subsequent steps or other system operations. Consuming and producing this data is generally done incrementally, where a step is processing one data item after another, but may also be done in batches, as will be obvious to one skilled in the art of real-time software. Initially, a description of the work units 225, or job to be performed, is provided to the controller. Such work unit and job descriptions typically are provided incrementally. Work unit descriptions for multiple jobs may be submitted in series or in parallel. New jobs may be submitted before previous jobs have been finished or even have been submitted completely.

The controller also has the models of the system modules available together with the current state of the system and information as to discrepancies between schedule and execution 260, e.g., which operations are currently performed by the modules, and any capabilities it may have previously planned and scheduled. From the set of submitted work unit descriptions, it is decided which should be planned and scheduled next. This selection is typically done in the same order as work units and jobs have been submitted, but it is also possible to start planning new jobs before previous jobs have been completely scheduled, for example taking into account the priorities of new jobs that have previously been unknown. The selected work units 225 are then transmitted to step 220, which plans and schedules the capabilities for the selected work units, taking into consideration the capability model for each module. This step is repeated for each work unit and diagnostic work unit selected in the previous step, and a set of scheduled capabilities 235 is created. At 230, failures are identified and a recovery mode is identified based on schedule and execution discrepancy data from 260. Concretely, any (significant) discrepancy between schedule and execution points to a possible failure. (Failures may be either current faults that need intervention, or imminent faults that may still be avoided.)

Thus, the software has to identify whether the reported execution will still satisfy the constraints given by jobs and models. For example, if a work unit stays longer in a module than expected, will it overlap (i.e., collide) with other scheduled work units? If a work unit is delayed, will it still satisfy the precedence constraints with respect to other work units? If a work unit transformation (e.g., change in orientation) wasn't executed, is that critical? This reasoning can be done by modifying the schedule based on the module reports and then checking it against the constraints. If the constraints continue to be satisfied, no further action should be necessary. (This also allows the modules some autonomy in resolving local issues, which further improves robustness.)

By updating or attempting to update schedules according to the module reports, the scheduler's facility to generate correct schedules (e.g., constraint solver) can be used to detect if production is becoming inconsistent due to execution differences. For example, if operations on a work unit are delayed, work units of the same jobs may be produced out of order (and thus precedence constraints will be violated) or work units may collide (and thus resource constraints will be violated). By comparing and integrating such execution differences into its schedules, the scheduler can immediately detect such inconsistencies.

If the constraints are no longer satisfied, the detailed system state provides a basis for determining whether and how the system can recover from the failure. For example, a typical result of failure is that parts of a job will violate their precedence constraints (i.e., would come out in a different order than desired because of delays of some work units) or will not be produced at all (because modules that were scheduled to produce them went off-line). The state will help identify those parts, such that the system control software can recover, perhaps by re-planning or rerouting these jobs. System failure identification and failure recovery mode are provided to planning and scheduling step 220 for incorporation into the dynamic system schedule.

Scheduled capabilities 235 are in turn provided to step 240, at which the controller sends the commands 245 corresponding to the scheduled capabilities to the individual modules. This step is repeated for each scheduled capability. Modules incrementally report the execution of capabilities at the same level of detail as defined in their models. For example, a transport module may define a "move" capability with an input time, an output time, an input work unit (and its attributes), an output work unit (and its attributes), and some constraints between these (e.g., time constraints between the time variables, attribute transformations between the work unit variables, etc.); if the system control software selects and schedules that capability (determining values for the time and attribute variables), a command will be sent to the module to execute this capability at the given time, and the module will report back the actual values (or the differences to the expected values) for the model variables (times, attributes, resources). These module reports 255 are logged at 250 and integrated to build a detailed log of the execution of its schedules. The log may explicitly or implicitly include a history of the system's behavior. For example, instead of a single value for timing values, the log may maintain a distribution of values, including frequency or likelihood of occurrence. This information is then utilized to update the system status 260 and generate a system report 270.

Figure 3:
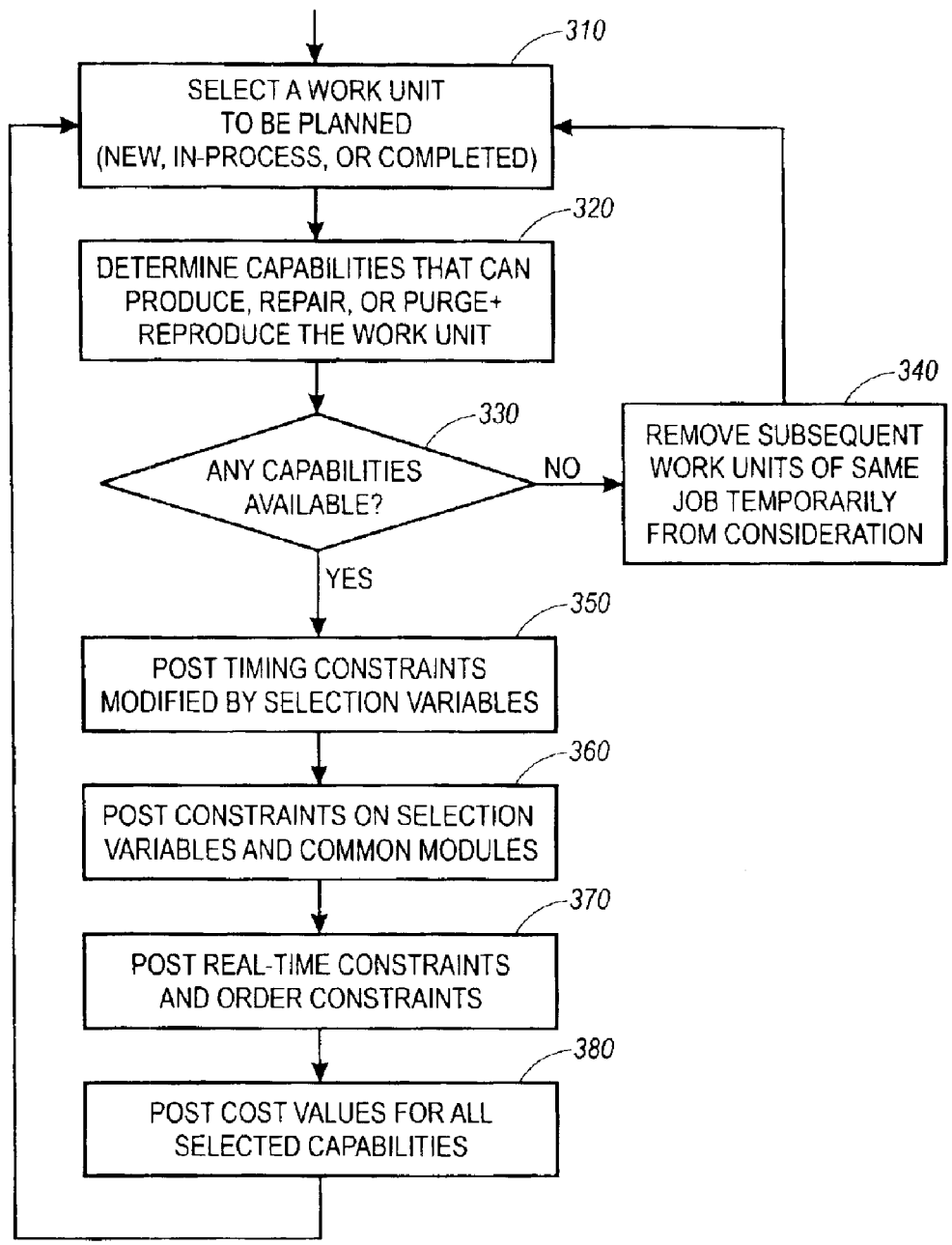
FIG. 3 provides a flow chart detailing the ordering of operations to accomplish predictive and preemptive planning for different job priorities in accordance with an embodiment of the subject invention.

Turning now to FIG. 3, the flowchart illustrates example operations utilized to accomplish predictive and preemptive planning in the presence of differing job priorities. In this example embodiment, the planner/scheduler also includes new jobs and considers the various priorities associated with them. The various priorities can, for example, be expressed in a cost model that considers not only the jobs' priorities, but also the cost of reproducing and/or delaying jobs. Inserting a high-priority job does not simply mean delaying or aborting lower-priority jobs. Depending on the current state and capabilities of the system, a new job may simply be produced in parallel to the current jobs, perhaps with some slight re-planning for the current jobs. In other cases, a current job may be almost done and delaying a higher-priority job for a short time may be less costly than re-creating the current job. Only if the cost of delaying a higher-priority job is higher than the cost of aborting and recreating another job should that option be chosen. The scheduler may even make these decisions at a finer granularity than jobs, namely individual work units. With the constraint-based scheduler, the decisions of what to delay, shelve (e.g., in a buffer tray), or purge and recreate can be done due to detailed information about the system's capabilities, the system's state, the jobs' requirements on the system, and the user's desired objective function (e.g., minimizing the completion time of the highest priority job). This approach further allows the user to make use of human intervention for decision making, e.g., by presenting the operator with several options based on the scheduler's information before committing to a course of action.

At 310 the controller selects a work unit to be planned, taking into consideration new, in-process, or completed jobs. The controller then determines, at 320, the capabilities necessary to produce, repair, or purge and reproduce the work unit. A capability to repair the schedule for a work unit includes, for example, the re-routing of the work unit or the delay of the work unit on the previously determined route. Capabilities for recovery, purging and recreation capabilities are all assigned costs. The total cost of a schedule is the sum of the costs of all selected capabilities. Thus, finishing an almost completed job should cost much less than purging and recreating it, while the incremental cost of delaying the higher-priority job for a brief time should be minor. Obviously, the converse would be true in those instances in which the cost of delaying a higher-priority job is higher than the cost of aborting and recreating another job, and thus aborting a lower-priority job would be chosen. Whenever possible, keeping a current plan and simply adding new jobs should have the lowest cost (no delays and no extra operations to execute), if that is an option.

The planner constantly revisits and questions previous decisions concerning scheduling as new jobs are received. For example, a current job may be purged only if a job of much higher priority is submitted. If all jobs have the same priorities or the priorities are only slightly different or a decision can be made without considering all possible scenarios (e.g., the current job is almost completed), the option to purge and reproduce the current job when a new job arrives doesn't even have to be considered. Consequently, 320 may alternatively include a decision component that knows certain heuristics about the jobs (such as those just mentioned) that help the planner avoid explicitly comparing all possible capabilities in detail.

The controller then determines what capabilities available at 330. If the capabilities sufficient to complete a job are unavailable, subsequent work units of the same job are temporarily removed from consideration at 340 and the controller returns to 310 to select a work unit to be planned. If sufficient capabilities are available, timing constraints modified by selection variables are posted at 350. The controller also posts constraints on selection variables and common modules at 360. Real-time constraints and order constraints are posted at 370, and cost values for all selected capabilities are posted at 380. The controller then returns to 310 and selects another work unit to be planned.

One example of pseudo code for planning and scheduling for different job priorities presented herein posts the entire (disjunctive) problem to the constraint store and uses Boolean variables to select among capabilities in order to plan and schedule at the same time. As one skilled in the art would appreciate, other approaches could be utilized, for example, the different alternative capabilities could be posted one after the other, with the search procedure backtracking over the selection and posting of alternative capabilities as needed. Such alternate approaches are fully contemplated by the specification and scope of the claims herein.

```
initialize schedule S and constraint store C;
repeat forever do
    given the current schedule S, determine set U_p of in-process work units u and set U_f of
        all other (future, including new) work units in S;
    for all work units u in U_p do
        determine set S_{u,c} of "create" capabilities s such that u = output work unit of s
            and exit port of s is in P_u
            and s does not use off-line resources;
        determine the exit port p_u of the module currently containing u;
        determine set S_{u,p} of "purge" capabilities s such that the entry port of s = p_u
            and exit port of s is a purge module
            and s does not use off-line resources;
        determine set S_{u,r} of "repair" capabilities s such that u = output work unit of s
            and exit port of s is in P_u
            and s does not use off-line resources;
        let S_u = union of S_{u,c}, S_{u,p}, and S_{u,r};
        add S_u to S;
        post to C: timing constraints of s_i in S_{u,c}, with selection variables b_i added;
        post to C: timing constraints of s_{i,p} in S_{u,p}, with selection variables b_{i,p} added;
        post to C: timing constraints of s_{i,r} in S_{u,r}, with selection variables b_{i,r} added;
        post to C: b_c = sum (s_i in S_{u,c}) b_i;
        post to C: b_p = sum (s_i in S_{u,p}) b_{i,p};
        post to C: b_r = sum (s_i in S_{u,r}) b_{i,r};
        post to C: b = b_p;
        post to C: 1 = b_p + b_r;
        post to C: real-time constraints for s_i in S_u;
        for all s_i in S_{u,c} and S_{u,r}, post to C: exit port of s_i = exit port of job of u; end for
        post to C: to = sum (s_i in S_{u,c} and S_{u,r}) b_i times output time of s_i;
        post to C: order constraint for t_o;
    end if
    end for
    for all work units u in U_f do
        (determine capabilities and post constraints as in regular scheduling;)
    end for
    for all schedules i in S_{u,r} for work units in U_p of jobs j do
        post objective c_i that combines the priority p_j of job j and the quality
            (e.g., end time) e_i of schedule i (e.g., c_i = b_i p_j e_i with schedule selection variable b_i);
    end for
    for all schedule pairs i in S_{u,p} and S_{u,c} for work units in U_p of jobs j do
        post objective c_i that combines the priority p_j of job j and the quality
            (e.g., end time) e_i of schedule i (e.g., c_i = b_i p_j e_i with schedule selection variable b_i);
    end for
    for all schedules i for work units in U_f of jobs j do
        post objective c_i that combines the priority p_j of job j and the quality
            (e.g., end time) e_i of schedule i (e.g., c_i = b_i p_j e_i with schedule selection variable b_i);
    end for
    for all jobs j and all possibly capabilities s_{i,j} in S_{u,c} and S_{u,r} scheduled above do
        r_{i,j} = resource for exit port of s_{i,j};
        if all work units in j are being scheduled then
            post to C: reserve r_{i,j} for the duration of job j;
        else
            post to C: reserve r_{i,j} for open-ended future for job j;
        end if
    end for
    solve for the undetermined time variables and selection variables in C,
    preferring schedules (and capabilities) i that optimize objectives c_i;
    send commands to modules based on selected capabilities (b_i = 1) in S and
        determined time variables in C;
    clean up completed parts of S and C;
end repeat
```

It will be appreciated that objectives may be computed in different ways, including objectives from individual work units (e.g., sum of priorities and schedule lengths for all individual work units) and objectives for entire jobs as planned and scheduled so far (e.g., priority and schedule length for the last work unit in a job).

Figure 4:
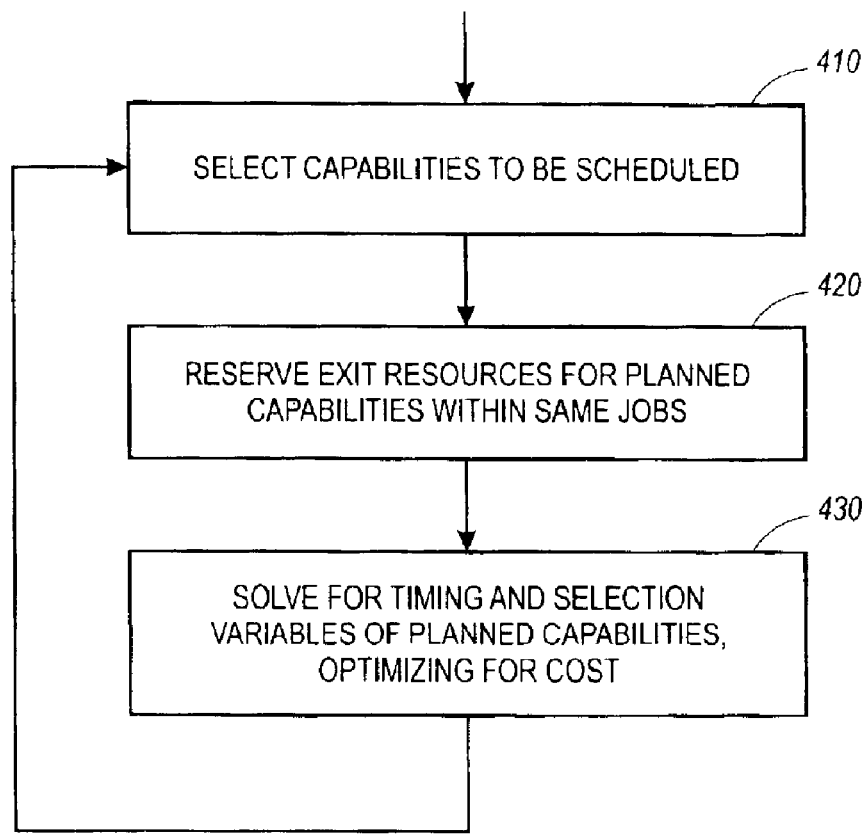
FIG. 4 provides a flow chart detailing the ordering of operations to accomplish scheduling in the presence of predictive and preemptive planning for different job priorities in accordance with one embodiment of the subject invention.

Turning now to FIG. 4, a flow chart illustrates the scheduling function of the controller. Initially, in step 410, the controller selects those capabilities to be scheduled, which may be all or a subset of the capabilities provided by the planning step. The controller then reserves exit resources for planned capabilities within the same jobs at step 420. Since all work units of the same job are constrained to be delivered to the same final exit port, the resource connected to that same final exit port, corresponding for example to a finisher stack in a print engine, cannot be used by other jobs until the job is finished. At step 430 the controller then solves for timing and selection variables of planned capabilities while optimizing for cost. This can be accomplished using a number of constraint solving or constrained optimization techniques, which are known to those skilled in the art.

While the present invention has been illustrated and described with reference to specific embodiments, further modification and improvements will occur to those skilled in the art. For example, various simplifications and pre-compilations of this approach may be possible. For example, an approximating heuristic may determine whether to abort or finish current jobs, based simply on the number of completed and unfinished work units in the job. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed:

1. A computer controlled system far configuration-specific reprioritization of jobs in a reconfigurable production system having a plurality of modules with a plurality of alternative capabilities for processing work units, the system comprising:
    a system controller;
    at least one centralized planning function for planning utilization of selected module capabilities in the production of jobs having not less than one work unit, wherein said module capabilities include the relative costs of said module capabilities, and wherein said centralized planning function has knowledge of module capabilities and of all planning and scheduling decisions; and
    at least one centralized scheduling function for scheduling utilization of said selected module capabilities in the production of said jobs having not less than one work unit, wherein said centralized scheduling function includes a resource constraint solver for balancing of production time and cost across the entire reconfigurable production system and for resolving resource contention prior to job production.

2. The system for configuration-specific reprioritization of jobs in a reconfigurable production system according to claim 1, further comprising at least one function for identifying performance failure of not less than one of said selected module capabilities in the production of said jobs having not less than one work unit.

3. The system for configuration-specific reprioritization of jobs in a reconfigurable production system according to claim 1, further comprising at least one function for recovering from performance failure of not less than one of said selected module capabilities in the production of said jobs having not less than one work unit.

4. The system for configuration-specific reprioritization of jobs in a reconfigurable production system according to claim 1, wherein said function for planning utilization of selected module capabilities comprises:
    means for selecting not less than one work unit to be planned; and
    means for determining capabilities associated with said not less than one work unit to be planned.

5. The system for configuration-specific reprioritization of jobs in a reconfigurable production system according to claim 4, wherein said not less than one work unit to be planned is associated with not less than one priority.

6. The system for configuration-specific reprioritization of jobs in a reconfigurable production system according to claim 5, wherein said not less than one priority is expressed in a cost model.

7. The system for configuration-specific reprioritization of jobs in a reconfigurable production system according to claim 1, wherein said not less than one work unit comprises not less than one new work unit.

8. The system for configuration-specific reprioritization of jobs in a reconfigurable production system according to claim 1, wherein said planning function further comprises:
    at least one function for determining module capabilities available in the reconfigurable production system;
    at least one function for posting timing constraints modified by selection variables;
    at least one function for posting constraints on selection variables and common modules;
    at least one function for posting real-time constraints and order constraints;
    at least one function for posting cost values for all selected capabilities; and at least one function for removing subsequent work units of the same job temporarily from consideration.

9. The system for configuration-specific reprioritization of jobs in a reconfigurable production system according to claim 1, wherein said selected module capabilities include capabilities necessary to produce said not less than one work unit.

10. The system for configuration-specific reprioritization of jobs in a reconfigurable production system according to claim 1, wherein said selected module capabilities include capabilities necessary to repair said not less than one work unit.

11. The system for configuration-specific reprioritization of jobs in a reconfigurable production system according to claim 1, wherein said selected module capabilities include capabilities necessary to purge and reproduce the work unit.

12. A method for configuration-specific reprioritization of jobs in a computer-controlled reconfigurable production system having a plurality of modules with a plurality of alternative capabilities for processing work units and including a centralized planning and scheduling function, the method comprising:
    selecting not less than one work unit to be planned by the centralized planning and scheduling function in the production of at least one job, wherein said job includes not less than one work unit and not less than one priority, and wherein said centralized planning and scheduling function has knowledge of module capabilities and of all planning and scheduling decisions;

determining capabilities necessary for executing said work unit;

determining whether sufficient module capabilities are available for executing said work unit and resolving resource contention prior to job production;

repeating selecting not less than one work unit to be planned, determining capabilities necessary for executing said work unit, and determining whether sufficient module capabilities are available for executing said work unit until all work units have been planned; and removing temporarily from consideration any work unit of a job for which sufficient module capabilities for executing said job are not available.

13. The method for configuration-specific reprioritization of jobs in a reconfigurable computer controlled production system having a plurality of modules according to claim 12, wherein determining capabilities necessary for executing said work unit comprises identifying capabilities necessary to produce said work unit.

14. The method for configuration-specific reprioritization of jobs in a reconfigurable computer controlled production system having a plurality of modules according to claim 12, wherein determining capabilities necessary for executing said work unit comprises identifying capabilities necessary to repair said work unit.

15. The method for configuration-specific reprioritization of jobs in a reconfigurable computer controlled production system having a plurality of modules according to claim 12, wherein determining capabilities necessary for executing said work unit comprises identifying capabilities necessary to purge and reproduce said work unit.

16. The method for configuration-specific reprioritization of jobs in a reconfigurable computer controlled production system having a plurality of modules according to claim 12, wherein each of said capabilities is assigned a cost.

17. The method for configuration-specific reprioritization of jobs in a reconfigurable computer controlled production system having a plurality of modules according to claim 12, further comprising:

selecting capabilities to be scheduled;

reserving exit resources for planned capabilities with the same jobs; and solving for timing and selection variables of planned capabilities.

18. The method for configuration-specific reprioritization of jobs in a reconfigurable computer controlled production system having a plurality of modules according to claim 17, wherein solving for timing and selection variables of planned capabilities further comprises optimizing for cost.

19. The method for configuration-specific reprioritization of jobs in a reconfigurable computer controlled production system having a plurality of modules according to claim 12, wherein determining capabilities necessary for executing said work unit further comprises limiting the module capabilities compared to a pre-identified subset of module capabilities.

20. The method for configuration-specific reprioritization of jobs in a reconfigurable computer controlled production system having a plurality of modules according to claim 12, wherein said work unit comprises not less than one new work unit.

21. The method for configuration-specific reprioritization of jobs in a reconfigurable computer controlled production system having a plurality of modules according to claim 12, wherein said work unit comprises not less than one in-process work unit.

22. The method for configuration-specific reprioritization of jobs in a reconfigurable computer controlled production system having a plurality of modules according to claim 12, further comprising:

posting tuning constraints modified by selection variables;

posting constraints on selection variables and common modules;

posting real-time constraints and order constraints; and posting cost values for all selected capabilities.

23. An article of manufacture comprising a computer usable medium having computer readable program code embodied in said medium which, when said program code is executed by said computer causes said computer to perform method steps for configuration-specific reprioritization of jobs in a reconfigurable computer controlled production system having a plurality of modules with a plurality of alternative capabilities for processing work units and including a centralized planning and scheduling function, the method comprising:

selecting not less than one work unit to be planned by the centralized planning and scheduling function in the production of at least one job, wherein said job includes not less than one work unit and not less than one priority, and wherein said centralized planning and scheduling function has knowledge of module capabilities and of all planning and scheduling decisions;

determining capabilities necessary for executing said work unit;

determining whether sufficient module capabilities are available for executing said work unit and resolving resource contention prior to job production;

repeating selecting not less than one work unit to be planned, determining capabilities necessary for executing said work unit, and determining whether sufficient module capabilities are available for executing said work unit until all work units have been planned; and removing temporarily from consideration any work unit of a job for which sufficient module capabilities for executing said job are not available.

* * * * *